US009173120B2

United States Patent
Dimou et al.

(10) Patent No.: US 9,173,120 B2
(45) Date of Patent: Oct. 27, 2015

(54) SYSTEM AND METHOD FOR PROCESSING RECEIVED DATA IN A WIRELESS NETWORK

(71) Applicant: TELEFONAKTIEBOLAGET L M ERICSSON (PUBL), Stockholm (SE)

(72) Inventors: Konstantinos Dimou, Stockholm (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 13/852,334

(22) Filed: Mar. 28, 2013

(65) Prior Publication Data

US 2014/0293801 A1    Oct. 2, 2014

(51) Int. Cl.
   *H04L 12/26*   (2006.01)
   *H04W 24/08*   (2009.01)
   *H04W 84/18*   (2009.01)

(52) U.S. Cl.
   CPC .............. *H04W 24/08* (2013.01); *H04W 84/18* (2013.01)

(58) Field of Classification Search
   None
   See application file for complete search history.

(56) References Cited

U.S. PATENT DOCUMENTS

| | | | |
|---|---|---|---|
| 2007/0030913 A1* | 2/2007 | Lin | 375/260 |
| 2010/0315207 A1 | 12/2010 | Bullard et al. | |
| 2010/0323683 A1* | 12/2010 | Kazmi et al. | 455/422.1 |
| 2012/0009979 A1 | 1/2012 | Thill et al. | |
| 2012/0020240 A1* | 1/2012 | Miura | 370/252 |
| 2012/0026898 A1 | 2/2012 | Sen et al. | |
| 2012/0197911 A1 | 8/2012 | Banka et al. | |

* cited by examiner

*Primary Examiner* — Afshawn Towfighi

(57) ABSTRACT

A method for communicating data within a wireless network includes receiving an indication of a measurement type from a wireless communication device and receiving a first wireless transmission pertaining to a first measurement performed by the wireless communication device. The method also includes, in response to the received transmission, obtaining a value of a second measurement of the measurement type. The second measurement is performed by a sensor associated with the base station. In addition, the method includes determining a value of the first measurement based on the received transmission and a value of a second measurement performed by the sensor associated with the base station.

23 Claims, 8 Drawing Sheets

SYSTEM AND METHOD FOR PROCESSING RECEIVED DATA IN A WIRELESS NETWORK

TECHNICAL FIELD OF THE INVENTION

This disclosure relates in general to wireless communication and, more particularly, to improving the reliability of wireless transmissions.

BACKGROUND OF THE INVENTION

Machine-to-machine (M2M) communication, also known as machine type communication (MTC), is becoming an increasingly critical consideration in the design of future communication technologies. By comparison to traditional services such as voice and web streaming, M2M services often place very different requirements on the wireless network due to the specific requirements specified for these services by Third Generation Partnership's (3GPP's) Long Term Evolution standard and other communication standards. Additionally, wireless networks providing M2M communication services may be expected to serve a significantly greater number of MTC user equipment (UEs) than typical wireless networks. Because of these constraints, there is an increasing need to support efficient and cost-effective wireless M2M communications and to develop a cost-, spectrum-, and energy-efficient radio access technology for M2M applications.

In M2M communications, various types of MTC communication devices such as smart meters, signboards, cameras, remote sensors, laptops, and appliances may be connected to the network. While the functionality and normal operation of these devices may vary, there are several characteristics that many MTC devices share. For example, many MTC devices often transmit information primarily in sporadic bursts of one or a few short packets. These packets often contain information such as measurements, reports and triggers, such as temperature readings, humidity measurements, and wind speed calculations. In many cases, MTC devices are static or have low mobility. MTC devices are typically expected to be low-complexity device that target low-end (low average revenue per user, low data rate, high latency tolerance) applications. The power/energy consumption for MTC devices are normally expected to be lower than typical communication devices as well.

In order to provide effective M2M communication service on a large scale, will require improvements to existing wireless networks. To provide coverage to a large number of MTC devices, a network operator could install a very dense deployment of base stations (including various combinations of macro, micro, pico and femto stations) and relay nodes to increase capacity, or could build very powerful base stations, having advanced receivers and several receiver antennas collecting weak signals from MTC devices. However, these solutions would require significant financial investment and installation efforts. As a result, new techniques are needed that can leverage and/or overcome characteristics that are common in MTC devices to provide efficient solutions for supporting M2M communications.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method of operating a wireless communication terminal [TBD]

In accordance with another embodiment of the present disclosure, a method of operating a network node in a wireless access network includes [TBD]

Important technical advantages of certain embodiments of the present invention include improving the reliability of measurements communicated in a wireless communication network. Particular embodiments may provide greater reliability in the collection and/or communication of various types of measurements. Certain embodiments may permit particular types of wireless communication devices to achieve similar signal-to-interference-plus-noise ratio (SINR) targets and/or data rates as conventional techniques, using lower transmission powers. Particular embodiments provide an error detection and correction scheme for certain types of communication that would otherwise lack any effective error detection scheme. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
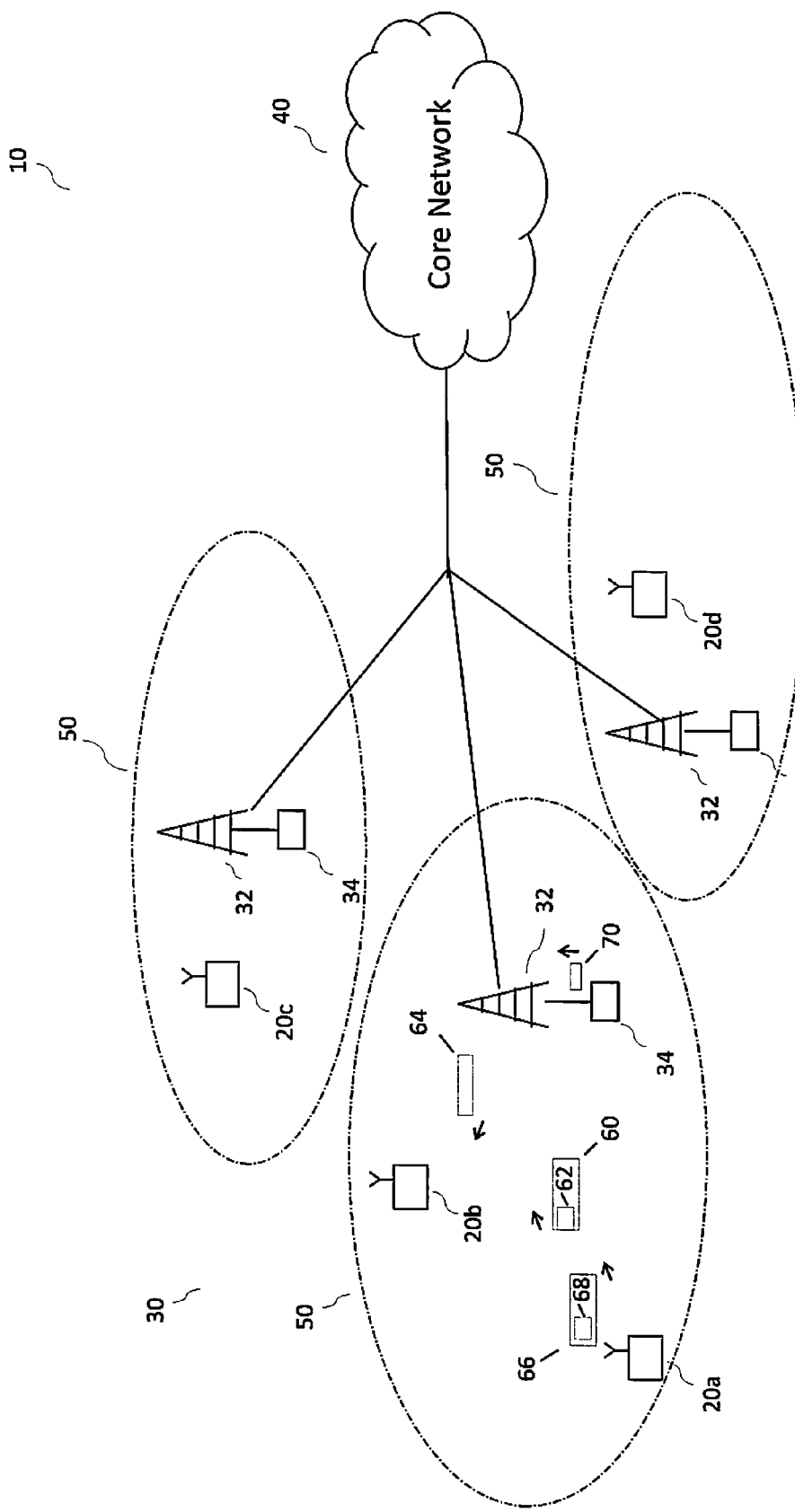
FIG. 1 illustrates a particular embodiment of a wireless communication system in which the described solutions may be implemented.

FIG. 1 illustrates a particular embodiment of a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. During operation, wireless communication devices 20 perform measurements and communicate those measurements to access network 30 wirelessly. To facilitate improved reliability in the communication of measurements by wireless communication devices 20, access network 30 may utilize data provided by one or more network sensors 34 or by other wireless communication devices 20 in processing data from measurements performed by wireless communication devices 20, as explained in further detail below.

In the example embodiment illustrated in FIG. 1, wireless communication system 10 provides wireless communication service to one or more wireless communication devices 20 operating within a plurality of cells 50, each representing a geographic area associated with wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication devices 20 include traditional communication devices such as wireless phones, personal digital assistants ("PDAs"), laptop computers, and any other portable communication device suitable for use with communication system 10. For example, in particular embodiments, wireless communication devices 20 may represent instances of LTE user equipment (UE). Additionally, in particular embodiments, wireless communication devices 20 may represent automated equipment or devices capable of machine type communication (MTC). For instance, wireless communication devices 20 may represent wireless meters or other sensors, digital billboards, wireless-capable appliances (e.g., a washing machine, oven, digital video recorder (DVR)), radiofrequency identifier (RFID) tags, or any other devices capable of wireless communication with access network 30. As a result, in particular embodiments, wireless communication devices 20 may only have limited communication capabilities (e.g., uplink- or downlink-only capability, or communication capabilities that are limited to certain information, such as control information, data related to software updates).

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. For example, in the illustrated embodiment, access network 30 includes one or more base stations 32. Access network 30 may also include base station controllers, access servers, gateways, relays, repeaters, and/or any additional components suitable for managing radio channels used by base station 32, authenticating users, controlling handoffs between radio access nodes (such as base stations 32), and/or otherwise managing the interoperation of radio access nodes and interfacing access network 30 with core network 40.

Base stations 32 communicate wirelessly with wireless communication devices 20 to facilitate wireless communication for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), an access point, or any other suitable element capable of communicating wirelessly with wireless communication devices 20. For purposes of simplicity the description below assumes, that base station 32 is the component of access network 30 responsible for providing certain functionality, such as receiving information on the measurements to be performed by wireless communication devices 20, receiving data from these measurements, and processing that data. However, any appropriate component or components of access network 30 may be responsible for performing these operations in a specific embodiment of wireless communication system 10.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

Network sensors 34 represent meters, detectors, or any other type of sensors capable of performing one or more of the measurement types performed by wireless communication devices 20. In some embodiments, network sensors 34 may each represent a device installed on a particular base station 32, integrated within a base station 32, or otherwise located at the same geographic location as a base station 32. In alternative embodiments, network sensors 34 may not be geographically co-located with base stations 32, but instead may each be connected to one or more base stations 32 by a direct wireline connection, by a wired network connection, by a high-quality wireless channel, or by some other type of connection. In general, network sensors 34 may each represent any sensors associated with one or more base stations 32 in any suitable manner such that the associated base station 32 can obtain measurements from network sensors 34 to use in processing measurements received from wireless communication devices 20.

In operation, wireless communication system 10 provides telecommunication service to wireless communication devices 20. As part of this service, wireless communication devices 20 wirelessly communicate data (represented by measurement data 68 in FIG. 1) resulting from measurements made by wireless communication devices 20 to access network 30. As explained in further detail below, access network 30 may obtain data (represented by supplemental measurement data 70 in FIG. 1) resulting from additional measurements that are performed by network sensors 34 or by other wireless communication devices 20 to confirm or to otherwise aid in processing measurement data 68 received from a particular wireless communication device 20. Consequently, in particular embodiments of wireless communication system 10, the communication of measurement data 68 resulting from measurements performed by wireless communication devices 20 may be more reliable and/or require less transmission, signaling, or power resources.

For purposes of this description, a measurement may represent a numeric determination (such as an operation that produces a quantity, percentage, or other numeric result), a detection (such as an operation determining an event has occurred or a condition has been satisfied), a media recording (such as an audio, video, or image recording), or any other operation that produces an output dependent on an occurrence, condition, property, or other phenomenon that can be recognized and/or evaluated by wireless communication devices 20.

Exchanging Measurement Capability Information

To facilitate the communication of measurements to access network 30, in particular embodiments of wireless communication system 10, a wireless communication device 20 (assumed for this example to be wireless communication device 20a) may communicate measurement capability information 62. Measurement capability information 62 provides access network 30 information on the measurements that the relevant wireless communication device 20 may perform. While measurement capability information 62 is transmitted by wireless communication device 20a in the example embodiment described below, access network 30 may, in alternative embodiments, be able to process measurements received by wireless communication devices 20 without prior preparation. As a result, in particular embodiments, wireless communication device 20a may not be expected to transmit any measurement capability information 62 before communicating measurements to base station 32.

Measurement capability information 62 may represent any form of information indicating the type of measurements that wireless communication device 20a will perform and/or is capable of performing Measurement capability information 62 may indicate the relevant measurement type or types in any suitable manner, directly or indirectly. As one example, measurement capability information 62 may represent a numeric value that maps to a predetermined set of one or more measurement types. As another example, measurement capability information 62 may represent a device type indicator that access network 30 may use in combination with other available information (e.g., a table maintained by access network 30 listing measurement capabilities for a number of different device types) to identify a type of measurement that wireless communication device 20a is capable of performing. As yet another example, measurement capability information 62 may represent a text identifier identifying the name of a measurement wireless communication device 20a may perform. In general, however, measurement capability information 62 may represent any suitable form of information indicating in any appropriate manner a type or types of measurements for which wireless communication device 20a may transmit data.

In particular embodiments, wireless communication device 20a communicates measurement capability information 62 to base station 32a while establishing a connection with access network 30. For example, in the example embodiment illustrated in FIG. 1, wireless communication device 20a communicates measurement capability information 62 as part of a connection request 60 (e.g., a radio resource control (RRC) Connection Request message) that includes an information element carrying measurement capability information 62. In certain embodiments, wireless communication device 20a may not communicate measurement capability information 62 to base station 32a automatically, and base station 32a may instead request measurement capability information 62 from wireless communication device 20a, either by default or based on some criteria (e.g., based on a device type of wireless communication device 20a). For example, in particular embodiments, base station 32a may receive a connection request 60 indicating a device type of wireless communication device 20a. Base station 32a may determine based on the device type whether to request measurement capability information 62 from wireless communication device 20a (e.g., using an RRC message containing an information element that carries such requests). In response to such a request, wireless communication device 20a will then transmit the requested measurement capability information 62 to base station 32a.

Configuring Network Sensors or Other Wireless Communication Devices

After determining that it is serving a wireless communication device 20 that will transmit measurement data 68, base station 32a may take steps to prepare for the receipt and processing of such measurement data 68. For example, after receiving measurement capability information 62 transmitted by wireless communication device 20a, base station 32a may take steps to prepare to receive data related to measurements of the type(s) indicated by measurement capability information 62. In particular embodiments, base station 32a may be associated with one or more network sensors 34, and base station 32a may be configured to use data provided by these network sensors 34 to confirm, or otherwise improve the reliability of, measurement data 68 received from wireless communication device 20a. In such embodiments, base station 32a may identify one or more network sensors 34 associated with the measurement type(s) to be performed by wireless communication device 20a. For example, if measurement capability information 62 indicates wireless communication device 20a can transmit temperature readings, base station 32a may identify one or more thermometers installed on or otherwise accessible by base station 32a. In particular embodiments, base station 32a may activate or otherwise configure the identified network sensors 34 to perform measurements of the relevant measurement type(s) and/or to communicate supplemental measurement data 70 based on those measurements to base station 32a.

Furthermore, in particular embodiments, base station 32a may use other wireless communication devices 20 served by access network 30, in addition to or instead of network sensors 34, to provide supplemental measurement data 70. Thus, in particular embodiments, base station 32a may identify one or more wireless communication devices 20 that can perform or will be performing measurements of the type(s) indicated by measurement capability information 62 (e.g., based on measurement capability information 62 or other information transmitted by those wireless communication devices 20). In such embodiments, base station 32a may activate some or all of the identified wireless communication devices 20 or otherwise configure these wireless communication devices 20 to perform and report measurements of the relevant type.

For example, in the illustrated example of FIG. 1, base station 32a identifies wireless communication device 20b as being a device that can perform one or more of the types of measurements identified by measurement capability information 62 received from wireless communication device 20a. Base station 32a then transmits a measurement configuration message 64 to wireless communication device 20b in the example embodiment of FIG. 1. Measurement configuration message 64 indicates to wireless communication device 20b one or measurements that wireless communication device 20b should perform and report to base station 32a. Measurement configuration message 64 may indicate a measurement type or types for which base station 32a expects to receive measurements from wireless communication device 20a, or more generally, measurement type(s) for which base station 32a would like to receive supplemental measurement data 70 from wireless communication device 20b. Measurement configuration message 64 may also indicate how often wireless communication device 20b should perform the relevant measurements, how often wireless communication device 20b should transmit data from these measurements to base station 32a, or other instructions regarding how wireless communication device 20b should perform or report the measurements.

In particular embodiments, measurement configuration message 64 may represent a type of message that base station 32 already uses to configure measurements performed by wireless communication device 20b for other purposes, such as mobility related measurements. For instance, measurement configuration message 64 may represent an RRC Measurement Control message that base station 32a transmits to wireless communication device 20b. In addition to any measurement objects corresponding to mobility-related signal strength measurements, this RRC Measurement Control message may include measurement objects that contain information to configure wireless communication device 20b to perform and report measurements that base station 32a can use to confirm measurements performed by wireless communication device 20a. This may allow wireless communication system 10 to configure wireless communication devices 20 to perform the described measurements with minimal additional signaling overhead and limited changes to their signaling protocols. Additionally, certain types of wireless communication devices 20 may be immobile and may not need to perform mobility measurements. Thus, by using existing measurement messages to signal configuration information pertaining to measurements for supplemental measurement data 70, base station 32a may be able to repurpose signaling messages that would otherwise not be useful for the wireless communication devices 20 in question.

Additionally, as part of preparing to receive data from wireless communication device 20a, base station 32a may also store information associating wireless communication device 20a with a measurement type and/or with particular devices that can confirm the data communicated by wireless communication devices 20. For example, base station 32a may store associated identifying wireless communication device 20a with specific network sensors 34 or other wireless communication devices 20 that are capable of performing the measurements identified by measurement capability information 62. Base station 32 can later use this information in processing measurements received from wireless communication device 20a.

Obtaining Measurement Data and Supplemental Measurement Data

Once base station 32a has completed any appropriate preparation, base station 32a can begin receiving and processing measurements from wireless communication device 20a. As explained above, wireless communication device 20a performs measurements and transmits measurement data 68 pertaining to the measurements to base station 32a. For example, if wireless communication device 20a represents or includes a barometer, wireless communication device 20a may transmit daily measurement reports that include atmospheric pressure values as measurement data 68. In the illustrated embodiment, wireless communication device 20a transmits measurement data 68 as part of a measurement report message 66 (e.g., an RRC Measurement Report or a separately defined RRC message for MTC devices).

Base station 32a may obtain supplemental measurement data 70 to confirm or to otherwise facilitate the processing of received measurement data 68. In some embodiments, base station 32a may obtain supplemental measurement data 70 to using in processing all measurement data 68 received from wireless communication devices 20. In other embodiments, base station 32a may decide, upon receiving measurement data 68, whether or not to obtain supplemental measurement data 70. Base station 32a may then obtain supplemental measurement data 70 to use in processing the relevant measurement data 68.

In particular embodiments, the decision to obtain supplemental measurement data 70 may be based on the device that transmitted the relevant measurement data 68 and/or the type of measurement that resulted in measurement data 68. For example, measurement report message 66 may indicate a measurement type for its included measurement data 68 or include a device identifier for the wireless communication device 20 that transmitted that measurement report message 66. Base station 32a may use this information to decide whether to obtain supplemental measurement data 70 to use in processing the received measurement data 68. As one example, base station 32a may decide to obtain additional measurements to use in processing measurement data 68 if a device identifier in measurement report message 66 is associated with a wireless communication device 20 that previously transmitted measurement capability information 62 or if measurement report message 66 indicates a measurement type supported by one of network sensors 34.

In particular embodiments, the decision to obtain supplemental measurement data 70 may also be based on whether base station 32a has already been unsuccessful in processing this particular set of measurement data 68 or other measurement data 68 received from wireless communication device 20a. For instance, base station 32a may decide to obtain supplemental measurement data 70 to process received measurement data 68 once base station 32a has unsuccessfully attempted to decode the relevant measurement data 68 or has otherwise determined that it did not successfully receive the relevant measurement data 68. In such embodiments, base station 32a may initially attempt to process received measurement data 68 without supplemental measurement data 70, but may then obtain supplemental measurement data 70 after determining it did not successfully receive measurement data 68. Alternatively, base station 32a may decide to obtain supplemental measurement data 70 based on whether base station 32a previously failed to successfully receive past measurement data 68 transmitted by wireless communication device 20a (e.g., based on whether base station 32a failed to decode without error previous measurement data 68 from wireless communication device 20a).

If base station 32a decides to obtain supplemental measurement data 70, base station 32a may then proceed to initiate additional measurements and/or take other steps to obtain supplemental measurement data 70. If base station 32a has not already done so, base station 32a may identify network sensors 34 or other wireless communication devices 20 (e.g., wireless communication device 20b) that can perform the type of measurement that corresponds to the received measurement data 68. Base station 32a may then initiate additional measurements by the identified network sensors 34/wireless communication devices 20 and/or request supplemental measurement data 70 resulting from such additional measurements.

In certain embodiments, network sensors 34 may represent simple devices directly connected to base station 32a that, while activated, continually perform the relevant measurement, such as a digital thermometer installed on base station 32a. In such embodiments, base station 32a may obtain supplemental measurement data 70 by simply determining a current reading of that network sensor 34. In other embodiments, network sensors 34 may be configured to log measurements, and base station 32a may retrieve from the log supplemental measurement data 70 reflecting the most recent logged measurement or a measurement logged within a particular amount of time of the measurement that resulted in the received measurement data 68. In yet other embodiments, network sensors 34 may represent more complicated devices that base station 32a interacts with through a communication protocol. In particular embodiments, base station 32 may obtain the additional measurement by transmitting a request for data to the relevant network sensor 34. The relevant network sensor 34 may then transmit a reply providing supplemental measurement data 70 to base station 32a. Additionally, in some embodiments, network sensors 34 may not be configured to perform measurements without prompting from base stations 32, and base station 32a may be responsible for triggering any additional measurements by instructing the relevant network sensor 34 to perform and report the relevant measurements. Thus, in such embodiments, base station 32a may instruct the relevant sensor 34 to perform the appropriate measurement after deciding to obtain additional information for processing received measurement data 68. The relevant network sensor 34 may then perform a measurement in response to the request and transmit a reply indicating the result of the additional measurement to base station 32a. More generally, obtaining supplemental measurement data 70 may involve, on the part of base station 32a or access network 30, any or all of configuring network sensors 34 or other wireless communication devices 20 to perform supplemental measurements, initiating performance of such measurements, and requesting supplemental measurement data 70 resulting from such measurements. Moreover, base station 32a and access network 30 may perform such steps in any suitable manner appropriate for the specific implementation of wireless communication system 10.

After obtaining supplemental measurement data 70, base station 32a may use this information in various ways, depending on the specific implementation, to facilitate the processing of measurement data 68 received from wireless communication device 20a. As one example, supplemental measurement data 70 may be used as a reference to detect transmission or other types of errors in the received measurement data 68. For example, base station 32a may compare a first measurement value provided by received measurement data 68 with a second measurement value provided by supplemental measurement data 70 resulting from a corresponding measurement performed by a network sensor 34. If the difference between the first value and the second value is greater than a predetermined threshold, base station 32a may request retransmission from wireless communication device 20 (e.g., by explicitly signaling a retransmission request) or take other remedial measures. As a result, this technique can be used to provide an error detection and retransmission scheme with decreased redundancy by comparison to conventional hybrid automatic retransmission request (HARQ) schemes. This may allow less complex and less expensive wireless communication devices 20 to be used in wireless communication system 10 without entirely sacrificing a retransmission scheme.

As another example, supplemental measurement data 70 may be used to assist in interpreting the received measurement data 68. For instance, base station 32 may be configured to decode and/or demodulate wireless transmissions received from wireless communication device 20 including those carrying measurement data 68. By using supplemental measurement data 70 to eliminate impossible or unlikely candidates when attempting to decode and/or demodulate received measurement data 68, base station 32a may ensure a correct interpretation of the received measurement data 68 or reduce the likelihood that base station 32a will unknowingly misinterpret received measurement data 68.

For example, wireless communication device 20 may transmit measurement data 68 to base station 32 as part of a wireless transmission that contains one or more modulation symbols. To interpret the received transmission, base station 32 may attempt to demodulate these modulation symbols. As part of this demodulation, base station 32 may attempt to detect which modulation symbol or symbols were included in the received transmission. Assume, for example, that measurement capability information 62 received by base station 32a indicates that wireless communication device 20a will be measuring and transmitting Fahrenheit temperatures for its current location encoded as eight-bit values representing a temperature range of 0 to 180 degree and that wireless communication device 20a uses a 16 QAM modulation scheme. Then, in this example, wireless communication device 20a transmit this measurement data 68 to base station 32a as two 16-QAM modulation symbols. Assume also that base station 32a identifies a network sensor 34 installed at base station 32a that likewise records temperatures and that base station 32a obtains supplemental measurement data 70 from the identified network sensor 34 providing another Fahrenheit temperature reading taken by that network sensor 34. If the supplemental measurement data 70 indicates that the temperature measured by the identified network sensor 34 is 30 degrees F., then assuming no unusual events have occurred (e.g., a fire at the location of wireless communication device 20a), the measurement data 68 received from wireless communication device 20a should be relatively close to the value indicated by supplemental measurement data 70. As a result, the symbol corresponding to the four most significant bits of measurement data 68 should be the modulation symbol for a value of "0000," indicating a temperature below 90 degrees (as would be expected for a temperature around 30 degrees). If base station 32a has uncertainty between symbols corresponding to "0000" and "1000" (or any other sequence of bits) during demodulation of the four most significant bits of measurement data 68, base station 32a may utilize the supplemental measurement data 70 to determine that "1000" is an impossible or highly improbable value for this particular modulation symbol of measurement data 68 and decide, therefore, that the received symbol should be demodulated to a value of "0000." Consequently, base station 32a may be able to correctly demodulate the received measurement data 68 in a situation in which base station 32a might otherwise be unable to confidently interpret one or more of the modulation symbols used to communicate measurement data 68.

As yet another example of how base station 32a may use supplemental measurement data 70, base station 32a may utilize supplemental measurement data 70 to determine a suitable measurement value after detecting an error in received measurement data 68. In particular embodiments, base station 32a may be configured to perform an error detection check on received measurement data 68, possibly after any decoding, demodulation, or other receiver processing is performed. This error detection check may be based on a comparison to supplemental measurement data 70 as explained above or some other error detection technique (e.g., a cyclic redundancy check (CRC) transmission-error detection procedure). If base station 32a determines that an error occurred in the generation or communication of the received measurement data 68, base station 32a may use supplemental measurement data 70 to determine a substitute value to use for the measurement corresponding to the received measurement data 68. As one example, base station 32a may simply discard the received measurement data 68 and use supplemental measurement data 70 to generate a value for the measurement in question. If the network sensor 34 or wireless communication device 20 that generated supplemental measurement data 70 typically generates measurement values similar to wireless communication device 20a, then supplemental measurement data 70 may provide a rough estimate of the value that measurement data 68 would have indicated had no error occurred. As a result, in such embodiments, supplemental measurement data 70 may provide a suitable substitute for received measurement data 68 when errors occur. Alternatively, in particular embodiments, if base station 32a detects that an error occurred, base station 32a may use both the received measurement data 68 and supplemental measurement data 70 to determine an appropriate substitute value for the relevant measurement (e.g., by averaging a value indicated by the received measurement data 68 with one indicated by supplemental measurement data 70, or by combining the values according to some suitable formula).

As yet another example of how base station 32a may use supplemental measurement data 70 in processing received measurement data 68, base station 32a may also utilize supplemental measurement data 70 to detect emergency situations, malfunctions, or other abnormal events occurring in the vicinity of wireless communication device 20a. For example, after receiving a temperature measurement from wireless communication device 20a, base station 32a may obtain supplemental measurement data 70 from an identified network sensor 34. If the temperature indicated by the received measurement data 68 and the temperature indicated by the obtained supplemental measurement data 70 differ by greater than a predetermined amount, base station 32a may attempt to determine whether an error occurred during transmission. For example, base station 32a may assess whether the channel quality of the channel used by wireless communication device 20a to transmit measurement data 68 is of a sufficiently high quality to make an error unlikely. Alternatively, base station 32a may request a retransmission of the relevant measurement data 68 to confirm whether the same or similar measurement is received again. If base station 32a eliminates the possibility of a transmission error, or determines a transmission error is sufficiently unlikely, base station 32a may determine that a malfunction or other abnormal situation has occurred. Depending on the configuration of base station 32, base station 32 may react to this abnormal measurement data 68 in any suitable manner, taking any appropriate remedial steps in response. For example, if wireless communication device 20a provides measurement data 68 indicating a significantly higher temperature than that indicated by supplemental measurement data 70, base station 32 may conclude a fire is occurring at the location of wireless communication device 20a and alert emergency service providers. As another example, base station 32 may conclude wireless communication device 20a has malfunctioned and dispatch a maintenance provider to test and repair wireless communication device 20a, or simply disregard future measurement data 68 received wireless communication device 20 due to the malfunction.

Thus, wireless communication system 10 may improve communication and/or interpretation of measurement data 68 transmitted by wireless communication devices 20 through the use of network sensors 34 and/or other wireless communication devices 20. Various embodiments of wireless communication system 10 may utilize supplemental measurement data 70 to reduce the likelihood of erroneous transmissions, improve detection of erroneous transmissions, provide alternative retransmission schemes, or otherwise improve the communication of measurement data 68 between wireless communication devices 20 and access network 30. As a result, particular embodiments of wireless communication system 10 may provide numerous operational benefits. However, specific embodiments may provide some, none, or all of these benefits, and may provide additional benefits to those described herein.

Figure 2:
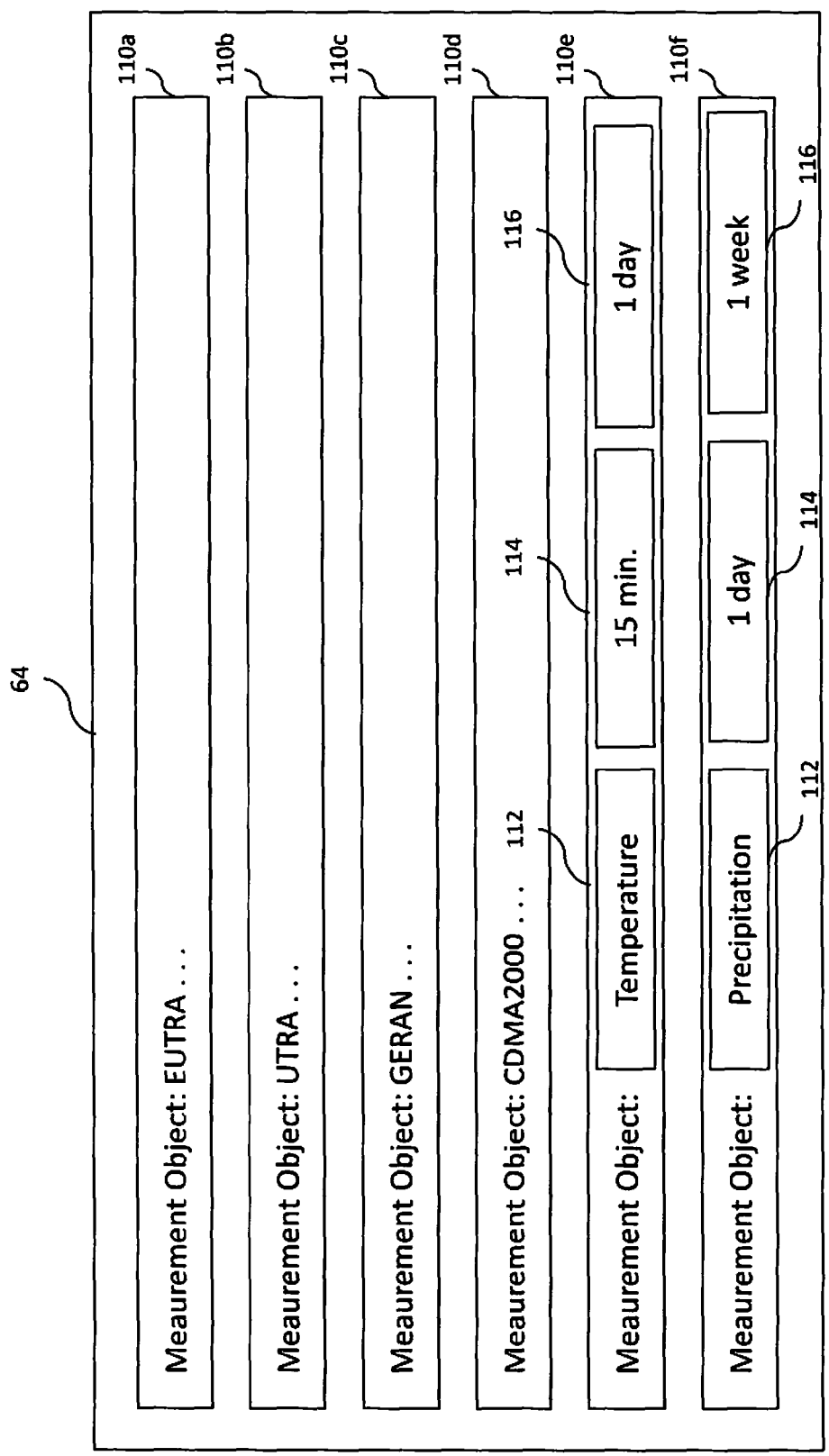
FIG. 2 shows a measurement configuration message that may be used to configure wireless communication devices to perform measurements.

FIG. 2 illustrates an example measurement configuration message 64 that may be used by access network 30 to configure wireless communication devices 20 to perform confirmatory measurements in embodiments in which access network processes measurement data 68 from one wireless communication device 20 using supplemental measurement data 70 provided by other wireless communication devices 20.

The example measurement configuration message 64 illustrated by FIG. 2 includes multiple measurement objects 110a-f. Each measurement object 110 instructs the receiving wireless communication device 20 to perform a particular measurement and may provide additional information to configure the receiving wireless communication device 20 to perform the measurement. In particular embodiments, certain measurement objects 110, such as measurement objects 110a-d in FIG. 2, may instruct wireless communication device 20b to perform signal strength measurements on base stations in neighboring cells associated with certain radio access technologies (e.g., EUTRA, UTRA, GERAN, and CDMA2000 in FIG. 2).

Additional measurement objects 110, such as measurement objects 110e-f in FIG. 2, may instruct wireless communication device 20b to perform other types of measurements that may be used to generate supplemental measurement data 70. These measurement objects 110 may also include any suitable information to permit wireless communication device 20b to configure itself appropriately to perform the requested measurements. In the illustrated example, measurement objects 110e and 110f each include a measurement type 112, a measurement frequency 114, and a reporting frequency 116 indicating to wireless communication device 20b, respectively, a type of measurement to perform, how often to perform that measurement, and how often to report the results of that measurement to access network 30. Thus, as shown by FIG. 2, wireless communication system 10 may utilize measurement configuration messages 64 that configure wireless communication devices 20 to perform measurements related to mobility or other aspects of the provided communication services to also configure wireless communication devices 20 to perform measurements for supplemental measurement data 70. As a result, particular embodiments of wireless communication system 10 may be able to limit the additional signaling overhead resulting from the described solutions and simplify the retrofitting of existing systems.

Figure 3:
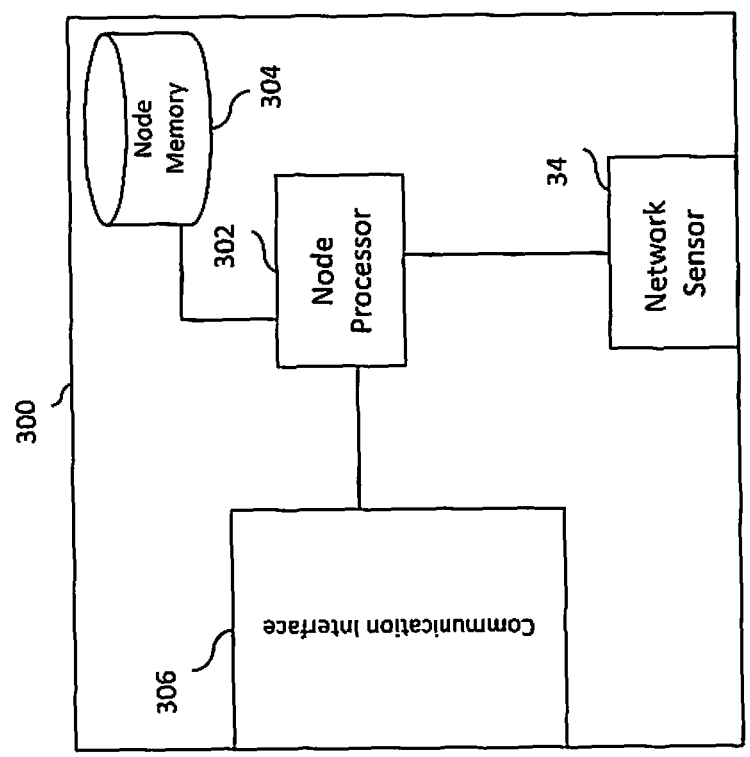
FIG. 3 is a block diagram illustrating a particular embodiment of a wireless communication device that may be utilized in the wireless communication system of FIG. 1.

FIG. 3 is a block diagram illustrating in greater detail the contents of a particular embodiment of a network node 300 that may be configured to utilize value information obtained from wireless communication device 20 to implement improved receiver techniques. Network node 300 may represent any suitable element of a radio access network capable of providing the described functionality, such as base station 32 in the embodiment illustrated by FIG. 1. As shown in FIG. 2, the example embodiment of network node 300 includes a node processor 302, a node memory 304, a communication interface 306, and a network sensor 308.

Node processor 302 may represent or include any form of processing component, including dedicated microprocessors, general-purpose computers, or other forms of electronic circuitry capable of processing electronic information. Examples of node processor 302 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of network node 300 that includes a single node processor 302, network node 300 may include any number of node processors 202 configured to interoperate in any appropriate manner.

Node memory 304 stores measurement data 68 and supplemental measurement data 70 obtained by network node 300. Node memory 304 may also store processor instructions for node processor 302, information on network sensors 34 (e.g., measurement capabilities, location) accessible by network node 300, information on wireless communication devices 20 served by network node 300, and/or any other data utilized by network node 300 during operation. Node memory 304 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2, node memory 304 may include one or more physical components local to or remote from network node 300.

Communication interface 306 comprises electronic circuitry and other components suitable to permit network node 300 to communicate with wireless communication device 20. For example, in embodiments in which network node 300 represents a node separate from the radio elements of access network 30 (e.g., a radio network controller), communication interface 306 may represent circuitry capable of communicating over a wireline connection between network node 300 and the radio elements of access network 30. In such embodiments, network node 300 may use communication interface 306 to transmit information to radio elements (such as a base station) that are capable of communicating wirelessly with wireless communication device 20. As an alternative example, in embodiments in which network node 300 itself represents a radio access element (such as an enhanced Node B (eNodeB) in a Long Term Evolution (LTE) system or another type of base station), communication interface 306 may instead or also include circuitry and components capable of communicating with wireless communication device 20 over a radio link, such as an antenna and radiofrequency transmitter and receiver.

Network sensor 308 is a sensor capable of taking measurements that may be used to generate supplemental measurement data 70. Network sensor 308 may be any suitable detector, meter, recording device, or any other type of sensor capable of performing the measurements described above. Examples of network sensor 308 include, but are not limited to, weather sensors (e.g., thermometers, barometers, wind gauges, hygrometers, precipitation gauges), object detection and imaging systems (e.g., motion sensors, radars, sonars, video cameras), and sensors associated with various physical phenomenon (e.g., photometers, microphones, seismometers, Geiger counters). While FIG. 3 illustrates an embodiment in which network sensor 308 is integrated into or installed on network node 300, network sensor 308 may instead be a separate element located remote from network node 300. In such embodiments, network node 300 may be configured to communicate with network sensor 308 over communication interface 306 or over a separate sensor interface.

Figure 4:
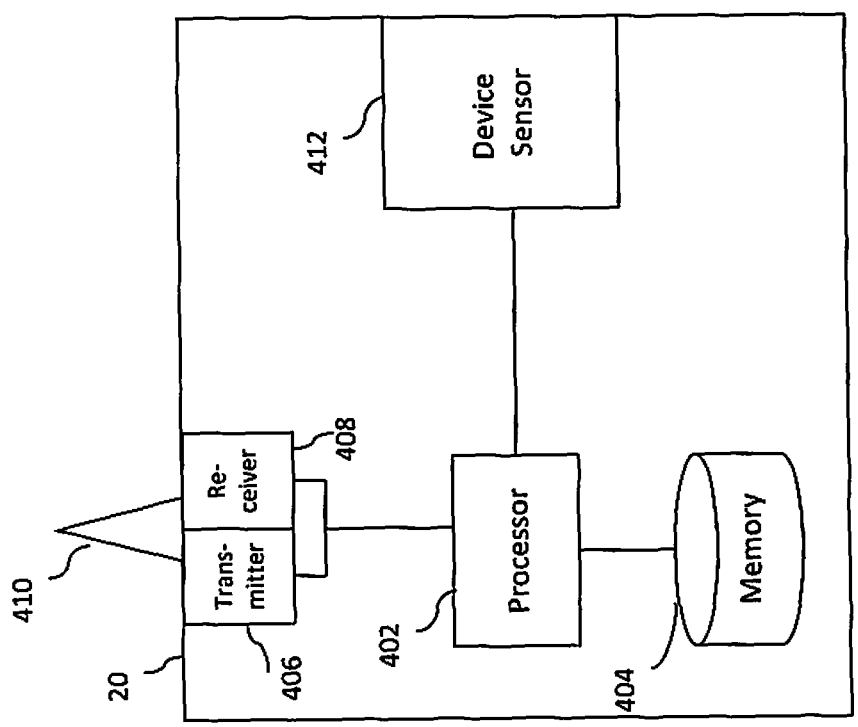
FIG. 4 is a block diagram illustrating a particular embodiment of a network node that may be utilized in the wireless communication system.

FIG. 4 is a block diagram illustrating in greater detail contents of a particular embodiment of wireless communication device 20. As shown in FIG. 3, the illustrated embodiment of wireless communication device 20 includes a processor 402, a memory 404, a transmitter 406, a receiver 408, an antenna 410, and device sensor 412.

Processor 402 may represent or include any form of processing component, including dedicated microprocessors, general-purpose computers, or other devices capable of processing electronic information. Examples of processor 402 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of wireless communication device 20 that includes a single processor 402, wireless communication device 20 may include any number of processors 302 configured to interoperate in any appropriate manner.

Memory 404 stores processor instructions, configuration information, power control parameters, format definitions, and/or any other data utilized by wireless communication device 20 during operation. Memory 404 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3 memory 404 may include one or more physical components local to or remote from wireless communication device 20.

Antenna 410 represents any suitable conductor capable of receiving and transmitting wireless signals. Transmitter 406 transmits radiofrequency (RF) signals over antenna 410, and receiver 408 receives from antenna 410 RF certain signals transmitted by access network 30. Although the example embodiment in FIG. 3 includes certain numbers and configurations of antennas, receivers, and transmitters, alternative embodiments of wireless communication device 20 may include any suitable number of these components. Additionally, transmitter 406, receiver 408, and/or antenna 410 may represent, in part or in whole, the same physical components. For example, particular embodiments of wireless communication device 20 include a transceiver representing both transmitter 406 and receiver 408.

Device sensor 412 is a sensor capable of taking measurements that may be used by wireless communication device 20 to generate measurement data 68. Device sensor 412 may be any suitable detector, meter, recording device, or any other type of sensor capable of performing the measurements described above. In particular embodiments, device sensor 412 may be identical to the corresponding network sensor 34 that is used to facilitate the processing of measurement data 68 transmitted by this wireless communication device 20. However, in particular embodiments, device sensor 412 may differ from the corresponding network sensor 34 in terms of its physical components and/or the measurements it performs (e.g., in terms of precision, the number of generated data points per measurement, the time length of the measurement). For example, device sensor 412 may be a significantly smaller physical component optimized for remote deployment by comparison to the corresponding network sensor 34. Moreover, measurement data 68 generated by device sensor 412 may differ in form and character from supplemental measurement data 70 generated by a corresponding network sensor 34.

Figure 5:
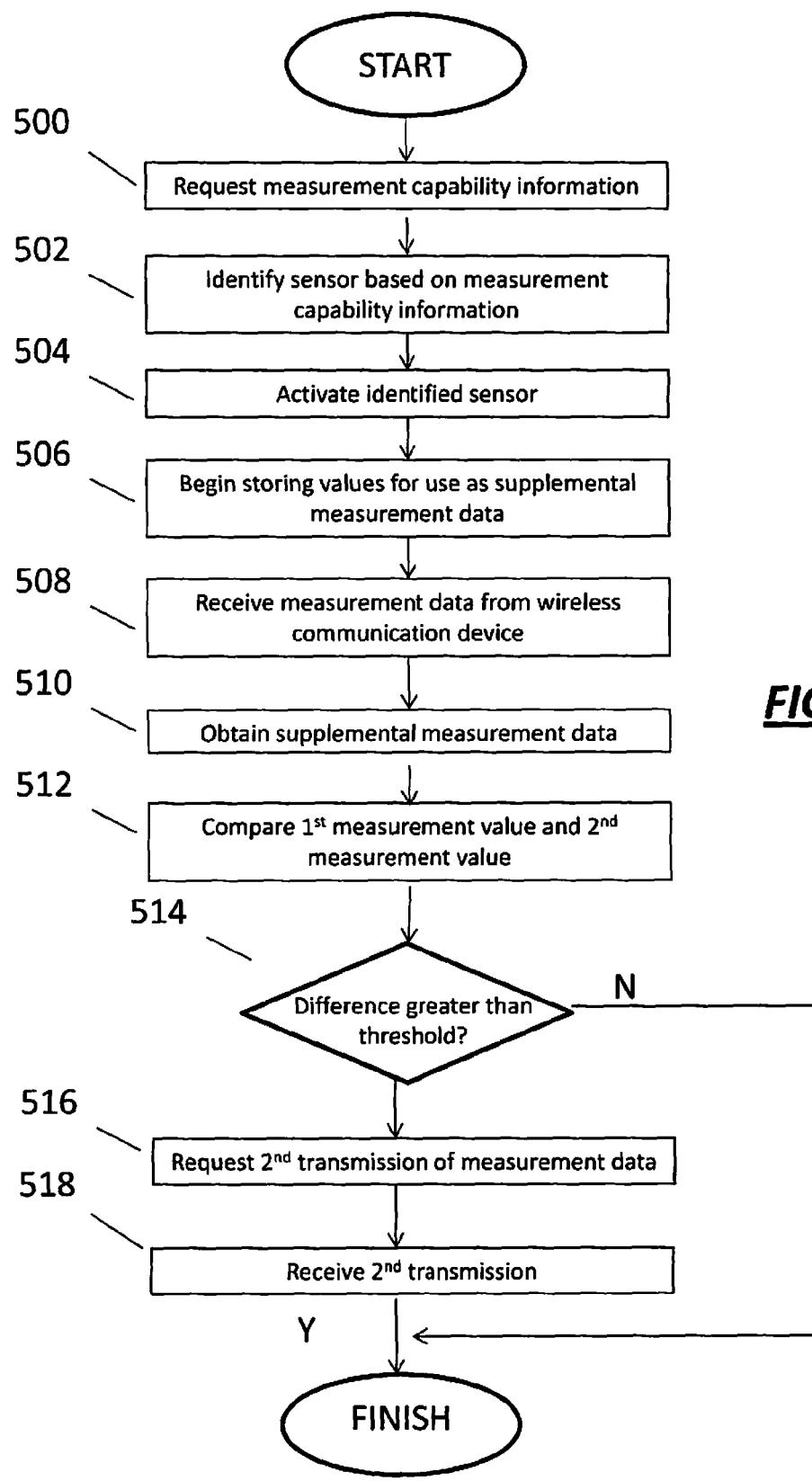
FIG. 5 is a flowchart showing example operation for particular embodiments of the network node capable of using supplemental measurement data to detect data in measurement data received from wireless communication devices.
Figure 6:
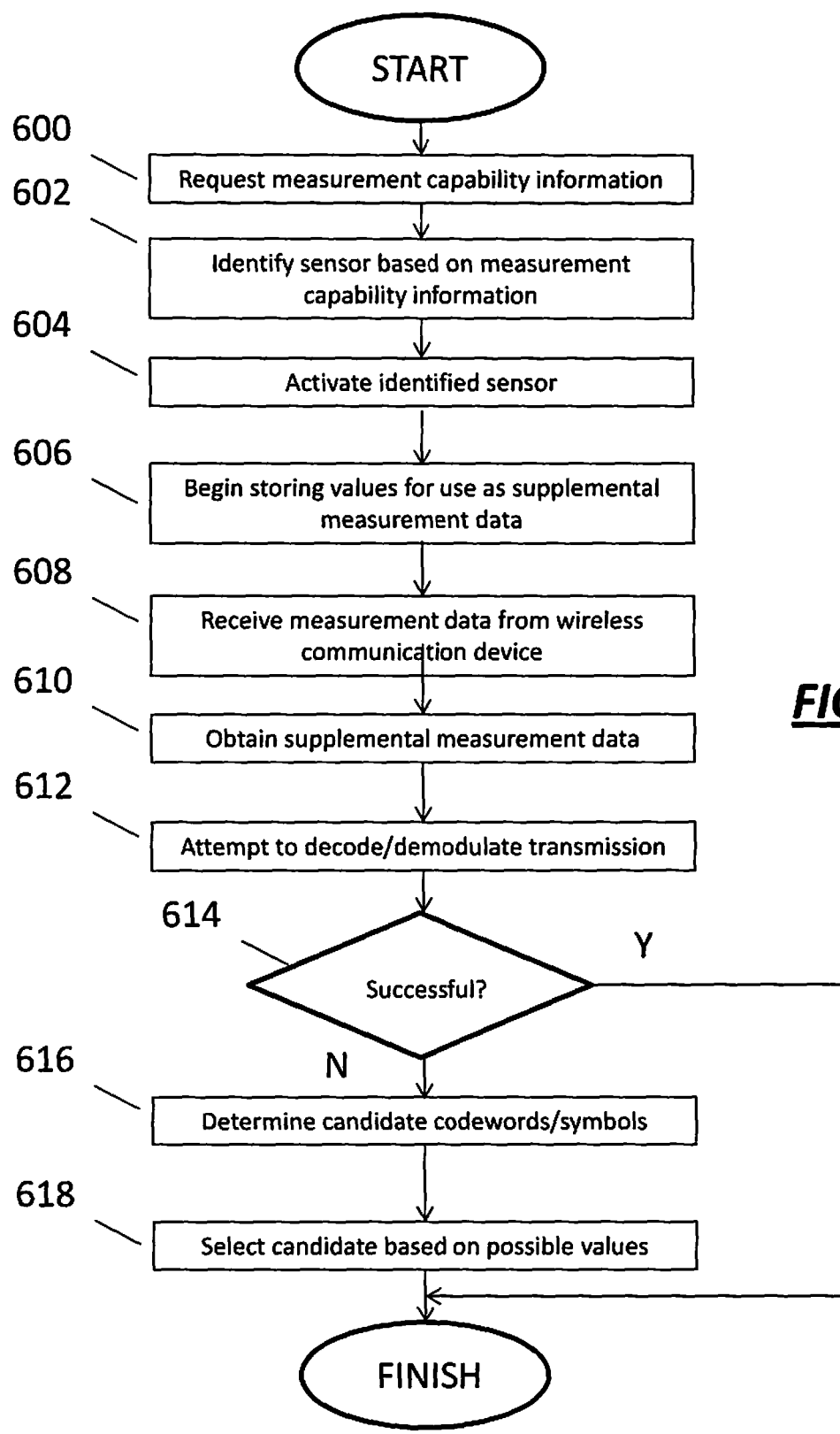
FIG. 6 is a flowchart showing example operation for particular embodiments of the network node capable of using supplemental measurement data to interpret measurement data received from wireless communication devices.
Figure 7A:
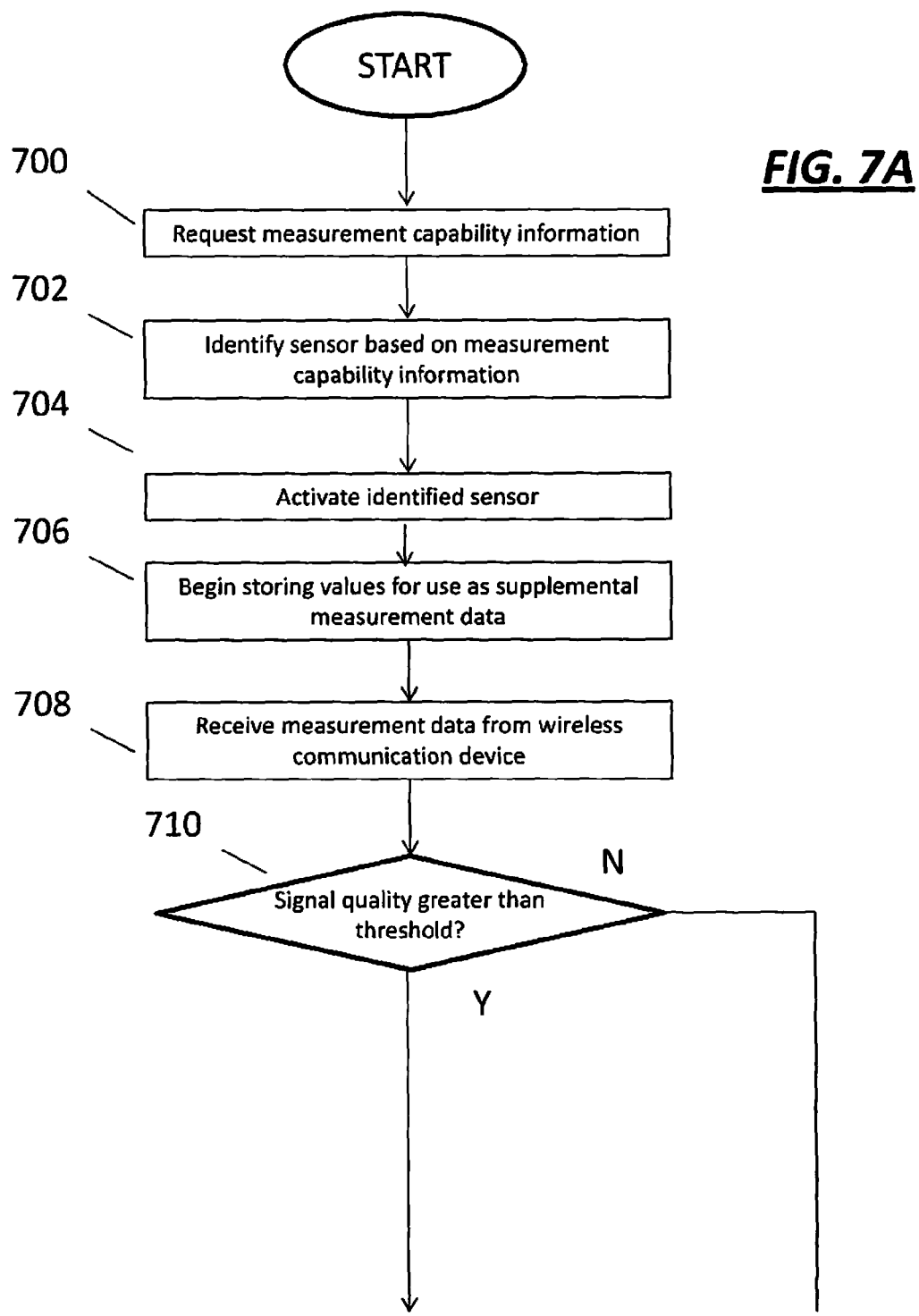
FIGS. 7A-7B are a flowchart showing example operation for particular embodiments of the network node capable of using supplemental measurement data to detect abnormal conditions.
Figure 7B:
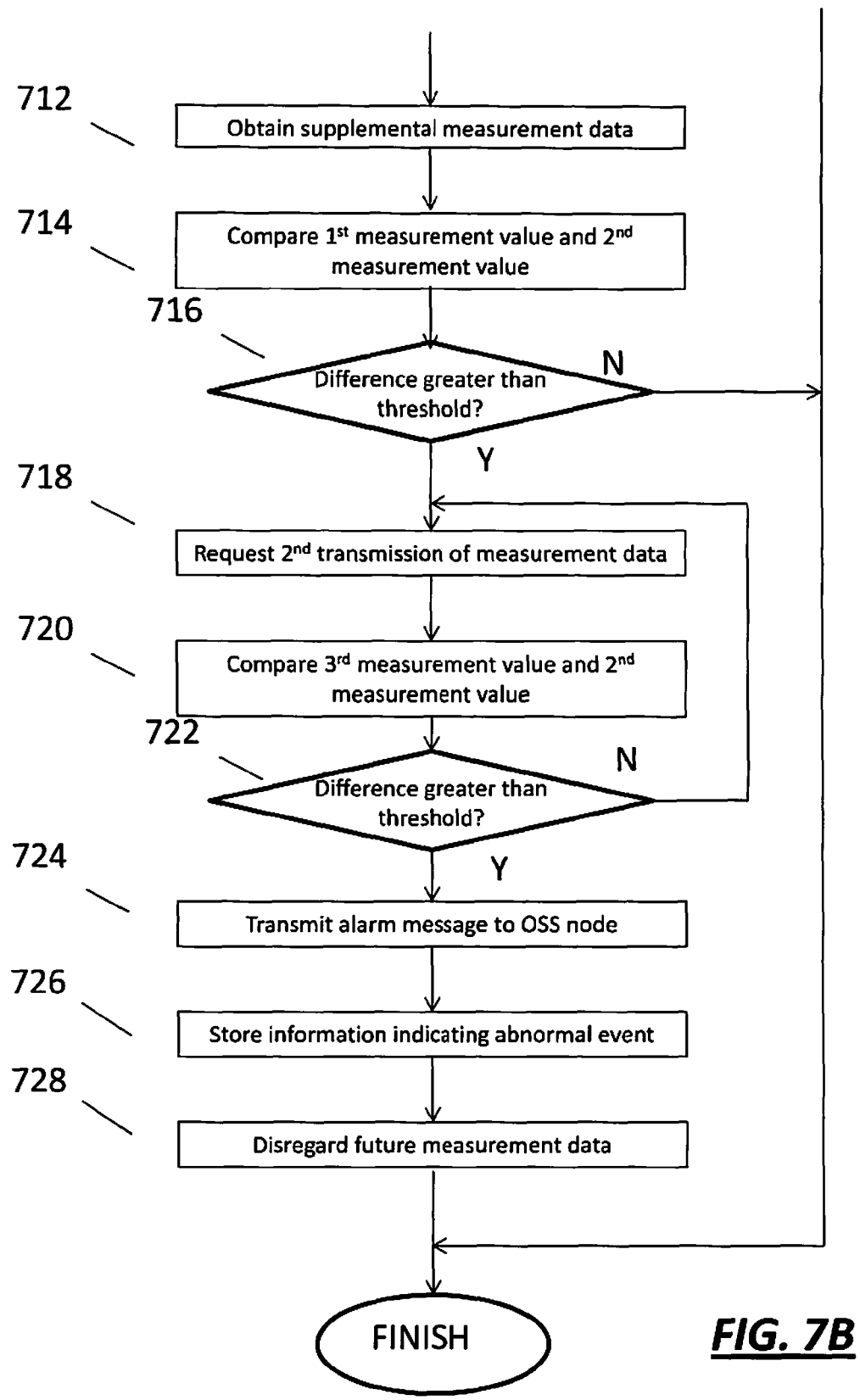

FIGS. 5-7 are flowcharts illustrating example operation of particular embodiments of a network node 300 (e.g., base station 32a in FIG. 1) in using supplemental measurement data 70 to determine a value for a measurement corresponding to received measurement data 68. More specifically, FIG. 5 illustrates an example in which network node 300 utilizes supplemental measurement data 70 to detect that an error has occurred in the communication of measurement data 68 received from wireless communication device 20a. By contrast, FIG. 6 illustrates an example in which network node 300 utilizes supplemental measurement data 70 provided by a network sensor 34 to interpret measurement data 68 received from wireless communication device 20a. Finally, FIGS. 7A-7B illustrate an example in which network node 300 utilizes supplemental measurement data 70 to detect the occurrence of an unusual event, such as a sensor malfunction at wireless communication device 20a or an emergency situation occurring in the vicinity of wireless communication device 20a. Any of the steps illustrated in FIGS. 5-7B may be combined, modified, or deleted where appropriate. Additional steps may also be added to the example operations shown. Furthermore, the described steps may be performed in any suitable order.

In the illustrated example of FIG. 5, operation begins with network node 300 receiving measurement capability information 62 from wireless communication device 20a at step 500. The measurement capability information 62 indicates measurement type(s) for one or more types of measurements to be performed by wireless communication device 20a. Wireless communication device 20 may provide measurement capability information 62 in any suitable manner. As explained above, in particular embodiments, wireless communication device 20 provides measurement capability information 62 in a connection request 60 (e.g., an RRC Connection Request message) transmitted to network node 300 or another element of access network 30 in accordance with a radio access technology supported by access network 30.

Network node 300 may respond to the received measurement capability information 62 by taking certain steps to prepare to receive measurement data 68 resulting from the described measurements. As explained above, network node 300 may prepare to receive measurement data 68 in any suitable manner based on the configuration and capabilities of network node 300. An example of how network node 300 may prepare in particular embodiments is shown by steps 502-506 in FIG. 5. Specifically, in the illustrated example, the received measurement capability information 62 indicates one of a plurality of measurement types supported by wireless communication system 10. Thus, in the illustrated example, network node 300 responds to the received measurement capability information 62 by identifying one of a plurality of network sensors 34 based on the received measurement capability information 62, at step 502. The identified network sensor 34 may be one that performs measurements of the same or a similar type to that indicated by the received measurement capability information 62, a network sensor 34 associated with a geographic location near network node 300 or wireless communication device 20a, and/or a network sensor 34 that satisfies one or more other criteria relevant to the measurement data 68 network node 300 will receive from wireless communication device 20a. For example, if measurement capability information 62 indicates that wireless communication device 20a will be performing temperature measurements, network node 300 may identify a network sensor 34 that includes or can access a thermometer in the vicinity of wireless communication device 20a.

Network node 300 may then configure the identified network sensor 34 as appropriate to provide supplemental measurement data 70 for network node 300 to use in processing measurement data 68 received from wireless communication device 20a. An example of this configuration is shown in FIG. 5 at steps 504-506. In particular embodiments, the relevant network sensor 34 may represent a simple sensor directly coupled to network node 300 that network node 300 can read or otherwise access as needed for supplemental measurement data 70, and no configuration of network sensor 34 may be necessary. In general, depending on the design of wireless communication system 10 and the capabilities of the identified network sensor 34, the specific configuration procedure, if any, may vary.

In the example embodiment, this configuration involves network node 300 activating the relevant network sensor 34 at step 504. Additionally, in the illustrated example, this activation causes the relevant network sensor 34 to initiate performance of periodic measurements of the indicated measurement type. At step 506, network node 300 (or the relevant network sensor 34) begins storing supplemental measurement data 70 based on the periodic measurements performed by the sensor. These stored values may be used later in the processing measurement data 68 received from wireless communication device 20a.

After any necessary configuration of the relevant network sensor 34 and any other necessary preparation has been completed, network node 300 can begin processing measurement data 68 received from wireless communication device 20a using supplemental measurement data 70. Thus, in the illustrated example, network node 300 receives a first wireless transmission (such as measurement report message 66 in FIG. 1) from wireless communication device 20a at step 508. This first wireless transmission includes measurement data 68 pertaining to a first measurement performed by wireless communication device 20a.

In response to this first wireless transmission, network node 300 obtains supplemental measurement data 70 from the relevant network sensor 34. In particular embodiments, this may involve explicitly instructing the relevant network sensor 34 to transmit supplemental measurement data 70 of a particular type or may involve reading supplemental measurement data 70 from a data stream network sensor 34 provides to network node 300. In particular embodiments, this may also involve activating the relevant network sensor 34 and/or initiating measurements by the relevant network sensor 34 if network node 300 has not already done so. In the illustrated example, it is assumed that network node 300 has already activated the relevant network sensor 34. Thus, at step 510, network node 300 obtains supplemental measurement data 70 by instructing network sensor 34 to transmit to network node 300 supplemental measurement data 70 associated with a measurement of the relevant measurement type performed by network sensor 34.

Network node 300 may then use the supplemental measurement data 70 to detect errors that may have occurred in the generation and/or transmission of measurement data 68 and take appropriate remedial actions if an error is detected. An example of this process is shown in steps 512-518. At step 512, network node 300 compares a first measurement value associated with measurement data 68 (e.g., network node's best estimate of the value transmitted by wireless communication device 20 as measurement data 68) with a second measurement value that is associated with supplemental measurement data 70. If network node 300 determines at step 514 that the first value differs from the second value by greater than a predetermined threshold amount, then network node 300 may determine that an error has occurred. If no error is detected, operation of network node 300 may then end with respect to receiving measurement data 68 for this particular measurement.

If network node 300 detects an error, however, network node 300 may take any appropriate remedial action in response (e.g., discard measurement data 68 and use a predetermined default value for the relevant measurement, re-use the most recent successfully-transmitted measurement data 68 from wireless communication device 20a). For instance, network node 300 may request a second transmission of measurement data 68 from wireless communication device 20 (e.g., by transmitting a negative acknowledgement (NACK) signal), as shown by step 516, in response to detecting the error. This second transmission of measurement data 68 may represent a retransmission of the original measurement data 68 by wireless communication device 20a or may represent a transmission of new measurement data 68 for a second measurement of the same measurement type performed by wireless communication device 20a. Network node 300 receives the second transmission at step 518. In particular embodiments, network node 300 may then receive the second transmission from wireless communication device 20a and perform a similar error on the second transmission, possibly requesting yet another transmission if another error is detected. In the illustrated embodiment, it is assumed that network node 300 detects no error in the second transmission. As a result, operation of network node 300 with respect to receiving measurement data 68 for this particular measurement then ends as shown in FIG. 5.

Although in the example illustrated by FIG. 5, network node 300 utilizes supplemental measurement data 70 provided by a network sensor 34 that is physically connected, directly or indirectly (e.g., through a network) to network node 300, network node 300 may utilize supplemental measurement data 70 provided by other wireless communication devices 20 instead of or in addition to supplemental measurement data 70 provided by such a network sensor 34. In such embodiments, another wireless communication device 20 may replace or supplement network sensor 34 in all of the steps described above for FIG. 5.

Turning to FIG. 6, operation of the example embodiment in FIG. 6 begins with network node 300 receiving measurement capability information 62 from wireless communication device 20a at step 600. Network node 300 performs this step in an analogous fashion to that described above for the similarly labeled step 500 in FIG. 5. Likewise, network node 300 performs steps 602-610 in an analogous manner to that described for the similarly-labeled steps 502-510 of FIG. 5.

As noted above, FIG. 6 illustrates a particular embodiment showing one specific example of how network node 300 may use supplemental measurement data 70—that is, to decode and/or demodulate a received wireless transmission that includes measurement data 68. Thus, for the example illustrated by FIG. 6, it is assumed that the network node 300 receives a data transmission that includes a set of data bits indicating a result of a measurement by wireless communication device 20a. Moreover, these data bits are encoded in one or more code words and/or modulated into one or more modulation symbols carried by the received wireless transmission.

As a result, network node 300 attempts to decode or demodulate the data bits in the received data transmission based on supplemental measurement data 70 at step 612. At step 614, network node 300 determines whether network node 300 successfully decoded the first data transmission. Network node 300 may determine this in any appropriate manner based on the configuration of wireless communication system 10. For example, in particular embodiments, network node 300 may utilize CRC information included in the wireless transmission to determine whether the decoding and/or the demodulation was successful, or may use supplemental measurement data 70, as described above with respect to FIG. 5, to detect potential errors. If network node 300 was successful, network node 300 may continue with the processing of measurement data 68 and operation of network node 300 with respect to receiving this particular set of measurement data 68 may then end as shown in FIG. 6.

In particular embodiments, this may involve network node 300 determining one or more candidates for a code word or modulation symbol included in the received data transmission, as shown at step 616. In particular embodiments, these candidates may be determined as part of the default or conventional decoding/demodulation performed by network node 300. After determining the candidates, network node 300 may select, from among the candidates, one or more code words or modulation symbols based on supplemental measurement data 70, as shown at step 618. For example, consider a scenario in which wireless communication device 20a is using two 16-QAM modulation symbols to transmit an eight-bit, Fahrenheit temperature measurement having a temperature range of 0 to 180 degrees. If network node 300 receives supplemental measurement data 70 indicating that the relevant network sensor 34 has recently measured a temperature of 45 degrees Fahrenheit, network node 300 may determine that, in the wireless transmission received from wireless communication device 20a, the modulation symbol carrying the four most significant bits of measurement data 68 should be demodulated to a value of "0000" (indicating a temperature below 90 degrees), rather than "1000" (or any other sequence of bits), based on the 45 degree measurement indicated by supplemental measurement data 70.

After demodulating and/or decoding the transmission of measurement data 68, network node 300 may continue with any further processing of measurement data 68. Operation of network node 300 with respect to receiving this set of measurement data 68 may then end as shown in FIG. 6. Additionally, as explained above, network node 300 may utilize supplemental measurement data 70 provided by other wireless communication devices 20 instead of or in addition to supplemental measurement data 70 provided by such a network sensor 34. In such embodiments, another wireless communication device 20 may replace or supplement network sensor 34 in all of the steps described above for FIG. 6.

As explained above, FIGS. 7A-7B illustrate example operation for a particular embodiment of network node 300 that is configured to detect the occurrence of abnormal events associated with the measurements performed by wireless communication device 20a. More specifically, in the illustrated embodiment, network node 300 detects situations in which the measurements performed by wireless communication device 20a differ significantly from what supplemental measurement data 70 suggests they should be. This may allow network node 300 to report to the network measurements suggesting that an abnormal event, such as a sensor malfunction or an emergency condition (e.g., a fire in the vicinity of wireless communication device 20a), has occurred that might otherwise be overlooked as an erroneous or ambiguous reception.

Operation of the example embodiment in FIG. 7A begins with network node 300 receiving measurement capability information 62 from wireless communication device 20a at step 700. Network node 300 performs this step in an analogous fashion to that described above for the similarly labeled step 500 in FIG. 5. Likewise, network node 300 performs steps 702-708 in an analogous manner to that described for the similarly-labeled steps 502-508 of FIG. 5.

Because, in the example of FIGS. 7A-7B, network node 300 will use measurement data 68 to detect abnormal events, network node 300 may check a signal quality associated with measurement data 68 (e.g., an SINR of the wireless transmission carrying measurement data 68) to confirm the signal quality is sufficiently high for measurement data 68 to be considered credible. Thus, at step 710, network node 300 determines whether a signal quality associated with received measurement data 68 is greater than a threshold quality level. If not, operation with respect to detecting abnormal events monitored by wireless communication device 20a may end as shown in FIG. 7B. In alternative embodiments, if the signal quality is not sufficiently high, network node 300 may continue with the processing of the received measurement data 68, attempting to decode and otherwise use the received measurement data 68 as normal. In such embodiments, network node 300 may use supplemental measurement data 70 to detect errors in the received measurement data 68 or assist in interpreting the received measurement data 68 as described above with respect to FIGS. 5 and 6.

If the signal quality is sufficiently high, network node 300 can safely rely on the measurement values indicated by the received measurement data 68. Under such circumstances, network node 300 can determine that a substantial difference between the values indicated by received measurement data 68 and those indicated by the corresponding supplemental measurement data 70 suggests that wireless communication device 20 made the measurement associated with the received measurement data 68 under abnormal conditions. Thus, at steps 712-716 in the illustrated example, network node 300 proceeds to obtain supplemental measurement data 70 and compare a first measurement value indicated by the received measurement data 68 with a second measurement value indicated by the supplemental measurement data 70 in a similar manner to that described above for steps 510-514 in FIG. 5. If the difference does not exceed a difference threshold, network then node 300 may determine that the measurement corresponding to the received measurement data 68 was performed under normal conditions and operation of network node 300 with respect to receiving this particular set of measurement data 68 may then end as shown in FIG. 7B.

If, however, the difference between the first value and the second value is greater than the difference threshold, then network node 300 may determine that wireless communication device 20a made the measurement corresponding to the received measurement data 68 under abnormal conditions. Depending on the configuration and capabilities of network node 300, network node 300 may determine that the relevant measurement was made under abnormal conditions generally and/or determine or assume that a specific abnormal event (e.g., a sensor malfunction; an environmental disaster) has occurred. For example, if a temperature reading indicated by the received measurement data 68 is more than 100 degrees higher than that indicated by supplemental measurement data 70 from a nearby network sensor 34, then network node 300 may determine that a fire is underway in the vicinity of the wireless communication device 20a.

In particular embodiments, network node 300 may use multiple measurements from wireless communication device 20a to prevent temporary measurement deviations, transmission errors that occur despite the high signal quality, or any other deviations that occur despite normal conditions from triggering a false alarm. Thus, in the illustrated example, network node 300 requests a second transmission of the relevant measurement data 68 by wireless communication device 20a at step 718. In particular embodiments, network node 300 may use both the retransmission and the original transmission to determine an updated measurement value (e.g., by soft-combining data from the original transmission with data from any retransmissions). Network node 300 may then confirm that a third measurement value indicated by the second transmission of measurement data 68 (or the combined data of the original transmission and any retransmission) differs from the second value indicated by supplemental measurement data 70 by more than the difference threshold. Thus, in the illustrated embodiment, network node 300 compares the third measurement value to the second measurement value, at step 720, and determines whether the difference exceeds the difference threshold, at step 722. If so, network node 300 may continue to step 724. Network node 300 may repeat steps 718-722 multiple times to further protect against false alarms. If the result of any additional comparisons of measurement data 68 to supplemental measurement data 70 still indicates a difference greater than the threshold, network node 300 may determine an abnormal condition has occurred or that wireless communication device 20a has otherwise become unreliable.

If network node 300 determines that the received measurement data 68 indicates that wireless communication device 20a has become unreliable, network node 300 may take any appropriate remedial actions. In particular embodiments, network node 300 may report the unreliability of wireless communication device 20a to an appropriate element of wireless communication system 10. For instance, at step 724 in the illustrated example, network node 300 transmits an alarm message to an operations support system (OSS) node of wireless communication system 10 indicating that measurement data 68 transmitted by wireless communication device 20a suggests an abnormal event has occurred.

Additionally, network node 300 may store information indicating that wireless communication device 20a has become unreliable (e.g., because of abnormal conditions or a malfunction affecting wireless communication device 20a). Network node 300 may store such information in local storage and/or transmit that information to a central device responsible for storing such information for various nodes of access network 30, as shown at step 726. Network node 300 may then use such information when processing future measurement data 68 received from wireless communication device 20a. For example, in particular embodiments, network node 300 may access information identifying wireless communication devices 20 from which network node 300 has received abnormal measurement data 68 whenever network node 300 receive measurement data 68 from a wireless communication device 20. If network node 300 determines that it has previously received abnormal measurement data 68 from the same wireless communication device 20, network node 300 may disregard the new measurement data 68 received from that wireless communication device 20, as shown at step 728 in the illustrated example.

In alternative embodiments, network node 300 may decide, as a result of determining that wireless communication device 20a is unreliable that future measurements from wireless communication device 20a should be confirmed before using, rather than simply disregarded. For example, in such embodiments, network node 300 may determine after a predetermined number of retransmissions that wireless communication device 20a needs "help" in reporting measurements. Consequently, when receiving subsequent measurement data 68 from wireless communication device 20a, network node 300 may automatically obtain supplemental measurement data 70 from an appropriate network sensor 34 to confirm, interpret, or otherwise process measurement data 68 received from wireless communication device 20*a*. After any appropriate remedial actions, the operation of network node 300 in this example embodiment may then end as shown in FIG. 7B.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating data within a wireless network, the method comprising:
   receiving, at a base station, an indication of a measurement type from a wireless communication device;
   receiving, at the base station, a first wireless transmission pertaining to a first measurement performed by the wireless communication device;
   in response to the received transmission, obtaining a value of a second measurement of the measurement type, wherein the second measurement is performed by a sensor associated with the base station; and
   determining a value of the first measurement based on the received transmission and the value of the second measurement performed by the sensor associated with the base station;
   wherein determining a value of the first measurement based on the received transmission and the second measurement comprises:
   deciding based on the received transmission and the value of the second measurement whether to request a second wireless transmission pertaining to the first measurement;
   requesting the second wireless transmission from the wireless communication device; and
   determining the value of the first measurement based on the second wireless transmission; and
   wherein deciding based on the received transmission and the second measurement whether to request the second wireless transmission comprises:
   decoding the received transmission to generate a first estimate of the first measurement;
   comparing the first estimate of the first measurement with a value of the second measurement; and
   deciding based on the comparison whether to request the second wireless transmission.

2. The method of claim 1, wherein receiving the indication of the measurement type comprises:
   receiving the indication of the measurement type; and
   in response to receiving the indication of the measurement type, activating the sensor associated with the base station.

3. The method of claim 2, wherein activating the sensor associated with the base station comprises:
   in response to receiving the indication of the measurement type from the wireless communication device, initiating performance of periodic measurements by the sensor associated with the base station; and
   storing a respective value for each of the periodic measurements performed by the sensor, and wherein the value of the second measurement comprises one of the stored values.

4. The method of claim 1, wherein obtaining the value of the second measurement comprises:
   in response to the received transmission, initiating performance of the second measurement by the sensor associated with the base station.

5. The method of claim 1, wherein obtaining the value of the second measurement comprises:
   in response to the received transmission, instructing the sensor to transmit the value of the second measurement.

6. The method of claim 1, wherein requesting the second wireless transmission comprises requesting a retransmission of the first wireless transmission.

7. The method of claim 1, wherein deciding based on the comparison comprises determining whether the first estimate of the first measurement differs from the value of the second measurement by more than a threshold amount.

8. The method of claim 1, further comprising:
   selecting an encoding scheme or a modulation scheme for the wireless communication device based on the measurement type; and
   transmitting information indicating the selected scheme to the wireless communication device.

9. The method of claim 1, wherein receiving the indication of the measurement type from the wireless communication device comprises:
   transmitting to the wireless communication device a request that the wireless communication device inform the base station of a measurement type associated with the wireless communication device; and
   receiving the indication of the measurement type from the wireless communication device in response to the request.

10. The method of claim 9, wherein transmitting the request comprises transmitting a radio resource control (RRC) message containing an information element requesting the measurement type.

11. The method of claim 9, wherein transmitting the request to the wireless communication device comprises:
    determining a device type associated with the wireless communication device; and
    deciding based on the device type to request that the wireless communication device inform the base station of the measurement type associated with the wireless communication device.

12. The method of claim 1, wherein:
    receiving the indication of the measurement type comprises receiving information from the wireless communication device indicating one of a plurality of measurement types supported by the network; and
    obtaining the value of the second measurement comprises:
    identifying, from among a plurality of sensors associated with the base station, a sensor corresponding to the measurement type; and
    obtaining the value of the second measurement from the identified sensor.

13. The method of claim 1, wherein determining a value of the first measurement comprises determining a value of the first measurement based on the received transmission, the value of the second measurement performed by the activated sensor, and a range associated with the measurement type.

14. The method of claim 13, wherein determining a value of the first measurement based on the received transmission, the value of the second measurement performed by the activated sensor, and a range associated with the measurement type comprises:
    decoding the received transmission to generate a plurality of estimates for the first measurement;

determining the value of the first measurement by selecting one of the estimates that differs from the second value by an amount that is within the range associated with the measurement type.

15. The method of claim 1, wherein the sensor associated with the base station comprises a sensor co-located with the base station.

16. The method of claim 1, wherein the sensor associated with the base station comprises a sensor connected to the base station by a wireline communication channel.

17. The method of claim 1, wherein the sensor associated with the base station comprises a second wireless communication device served by the base station.

18. A network node for receiving data within a wireless network, the method comprising:
- a receiver configured to receive information wirelessly from one or more wireless communication devices; and
- a processor configured to:
  - receive an indication of a measurement type from a wireless communication device;
  - receive a first wireless transmission pertaining to a first measurement performed by the wireless communication device;
  - in response to the received transmission, obtain a value of a second measurement of the measurement type, wherein the second measurement is performed by a sensor associated with the network node; and
  - determine a value of the first measurement based on the received transmission and the value of the second measurement performed by the sensor associated with the apparatus;
  - wherein determining a value of the first measurement based on the received transmission and the second measurement comprises:
  - deciding based on the received transmission and the value of the second measurement whether to request a second wireless transmission pertaining to the first measurement;
  - requesting the second wireless transmission from the wireless communication device; and
  - determining the value of the first measurement based on the second wireless transmission; and
  - wherein deciding based on the received transmission and the second measurement whether to request the second wireless transmission comprises:
  - decoding the received transmission to generate a first estimate of the first measurement;
  - comparing the first estimate of the first measurement with a value of the second measurement; and
  - deciding based on the comparison whether to request the second wireless transmission.

19. A method for communicating data within a wireless network, the method comprising:
- receiving, at a base station, an indication of a measurement type from a wireless communication device;
- receiving, at the base station, a first wireless transmission pertaining to a first measurement performed by the wireless communication device;
- obtaining a value of a second measurement of the measurement type, wherein the second measurement is performed by a sensor associated with the base station;
- determining whether a signal quality of a wireless link associated with the first wireless communication device is greater than a quality threshold;
- in response to determining that the signal quality of the wireless link is greater than the quality threshold, comparing a value of the first measurement to the value of the second measurement; and
- in response to determining that the value of the first measurement differs from the value of the second measurement by more than a difference threshold, determining that the wireless communication device is unreliable;
- wherein determining that the wireless communication device is unreliable comprises:
- storing information indicating that the wireless communication device is unreliable;
- receiving a second wireless transmission pertaining to a third measurement performed by the wireless communication device;
- based on the stored information, deciding to obtain supplemental measurement data pertaining to a fourth measurement performed by a sensor associated with the base station; and
- using the supplemental measurement data in processing the second wireless transmission.

20. The method of claim 19, wherein determining that the wireless communication device is unreliable comprises:
- storing information indicating that the wireless communication device is unreliable; and
- disregarding a second wireless transmission pertaining to a third measurement performed by the wireless communication device based on the stored information.

21. The method of claim 19, wherein determining that the wireless communication device is unreliable comprises transmitting an alarm message identifying the wireless communication device to a network node.

22. A network node for receiving data within a wireless network, the method comprising:
- a receiver configured to receive information wirelessly from one or more wireless communication devices; and
- a processor configured to:
  - receive an indication of a measurement type from a wireless communication device;
  - receive a first wireless transmission pertaining to a first measurement performed by the wireless communication device;
  - obtain a value of a second measurement of the measurement type, wherein the second measurement is performed by a sensor associated with the base station;
  - determine whether a signal quality of a wireless link associated with the first wireless communication device is greater than a quality threshold;
  - in response to determining that the signal quality of the wireless link is greater than the quality threshold, compare a value of the first measurement to the value of the second measurement; and
  - in response to determining that the value of the first measurement differs from the value of the second measurement by more than a difference threshold, determine that the first wireless communication device is unreliable;
  - wherein determining that the wireless communication device is unreliable comprises:
  - storing information indicating that the wireless communication device is unreliable;
  - receiving a second wireless transmission pertaining to a third measurement performed by the wireless communication device;
  - based on the stored information, deciding to obtain supplemental measurement data pertaining to a fourth measurement performed by a sensor associated with the base station; and using the supplemental measurement data in processing the second wireless transmission.

23. A method for communicating data within a wireless network, the method comprising:
- receiving, at a base station, an indication of a measurement type from a wireless communication device;
- receiving, at the base station, a first wireless transmission pertaining to a first measurement performed by the wireless communication device;
- in response to the received transmission, obtaining a value of a second measurement of the measurement type, wherein the second measurement is performed by a sensor associated with the base station; and
- determining a value of the first measurement based on the received transmission and the value of the second measurement performed by the sensor associated with the base station;
- wherein determining a value of the first measurement comprises determining a value of the first measurement based on the received transmission, the value of the second measurement performed by the activated sensor, and a range associated with the measurement type; and
- wherein determining a value of the first measurement based on the received transmission, the value of the second measurement performed by the activated sensor, and a range associated with the measurement type comprises:
- decoding the received transmission to generate a plurality of estimates for the first measurement;
- determining the value of the first measurement by selecting one of the estimates that differs from the second value by an amount that is within the range associated with the measurement type.

* * * * *

UNITED STATES PATENT AND TRADEMARK OFFICE
CERTIFICATE OF CORRECTION

PATENT NO. : 9,173,120 B2
APPLICATION NO. : 13/852334
DATED : October 27, 2015
INVENTOR(S) : Dimou et al.

Page 1 of 1

It is certified that error appears in the above-identified patent and that said Letters Patent is hereby corrected as shown below:

In the specification

In Column 5, Line 32, delete "performing" and insert -- performing. --, therefor.

Signed and Sealed this
Second Day of August, 2016

Michelle K. Lee
*Director of the United States Patent and Trademark Office*